United States Patent [19]

Kyogoku et al.

[11] Patent Number: 5,093,028
[45] Date of Patent: Mar. 3, 1992

[54] GELLED EMULSION AND PROCESS FOR PRODUCING THE SAME

[75] Inventors: Nobuo Kyogoku; Keiko Harada, both of Osaka, Japan

[73] Assignee: Suntory Limited, Osaka, Japan

[21] Appl. No.: 422,040

[22] Filed: Oct. 16, 1989

[30] Foreign Application Priority Data

Oct. 15, 1988 [JP] Japan ................................ 63-260190

[51] Int. Cl.⁵ ............................................. B01J 13/00
[52] U.S. Cl. ................................ 252/315.1; 252/312; 426/573
[58] Field of Search ........................... 252/312, 315.1; 426/573

[56] References Cited

U.S. PATENT DOCUMENTS

| | | | |
|---|---|---|---|
| 1,663,323 | 3/1928 | Whatmough | 252/312 |
| 2,121,305 | 6/1938 | Schrader et al. | 252/312 |
| 3,712,865 | 1/1973 | Evans et al. | 252/312 |
| 3,836,678 | 9/1974 | Leidy et al. | 426/573 |
| 4,042,718 | 8/1977 | Rawlings et al. | 426/573 |
| 4,401,825 | 8/1983 | Weinges et al. | 560/121 X |
| 4,486,345 | 12/1984 | Callewaert | 426/573 X |
| 4,808,334 | 2/1989 | Ezaki et al. | 252/312 X |
| 5,037,664 | 8/1991 | Kyogoku et al. | 426/573 |

FOREIGN PATENT DOCUMENTS

| | | |
|---|---|---|
| 59-059151 | 7/1984 | Japan . |
| 61-047167 | 7/1986 | Japan . |
| 2-58641 | 1/1988 | Japan . |
| 1-57981 | 6/1988 | Japan . |
| 1-023861 | 5/1989 | Japan . |

OTHER PUBLICATIONS

New Techn. Japan, vol. 16, No. 7 Oct. 1988 Summary Book Presenting Lectures Given at the 35th Meeting (1988 of Nippon Shokuhin Kogyo Gakkai), p. 33.
Summary of Alecture Given at a Meeting Held on Jun. 7-9, 88 by Kinki Kagaku Kyokai, p. 219.
Japan Industrial Newspaper, Jun. 8, 1988.

*Primary Examiner*—Richard D. Lovering
*Attorney, Agent, or Firm*—Cushman, Darby & Cushman

[57] ABSTRACT

Gel and stabilized emulsion each of which is composed of a protein and a fat or oil component and is heat-stable and resistant to separation of the oil or fat component. Also disclosed is a process for producing said gel or stabilized emulsion by crosslinking the protein in an emulsion composed of a protein and a fat or oil component with an iridoid compound.

11 Claims, No Drawings

GELLED EMULSION AND PROCESS FOR PRODUCING THE SAME

FIELD OF THE INVENTION

The present invention relates to a method of gelling an emulsion composed of a fat or oil content and a protein. In particular, the present invention relates to a process for producing a gel by crosslinking the protein in an emulsion composed of protein and oil (or fat) with an iridoid compound. The gel thus obtained is stable in that the oil upon standing and in that it is resistant to heat.

According to another aspect of the present invention, the method of gelation by crosslinking the protein in a emulsion of protein and oil (or fat) with an iridoid compound is combined with another method known in the art for gelling emulsions.

According to still another aspect of the present invention, a stabilized emulsion is produced by crosslinking the protein in an emulsion of protein and oil (or fat) contents with an iridoid compound.

The present invention also relates to a gel or stabilized emulsion produced by the methods described above.

PRIOR ART

Many oil (or fat) containing gels are available that are produced by utilizing various functional characteristics of proteins such as emulsifiability and gelability, and examples are traditional Japanese food products such as yuba, aburaage and ganmodoki, and dairy products such as cheese and yogurt. The use of such oil (or fat) containing gels has recently expanded and they are also used as extenders in processed meat products such as sausages.

Food products such as yuba, aburaage and ganmodoki are produced by a process in which a fat or oil content is emulsified with soybean protein to form a gelled emulsion and is further processed by heating or some other suitable treatment. A problem with this method is that as the proportion of the oil or fat content in the emulsion increases, the firmness of resulting gel tends to decrease, accompanied by such disadvantages as separation of the fat or oil content. The use of an oil or fat containing gel as an extended in processed meat products is shown in Japanese Patent Public Disclosure No. 63-192362 which teaches that an oil or fat content is emulsified together with a whey protein, with the emulsion being heated to form a thermally denatured gel suitable for use as an extender in processed meat products. However, in the case of sausages and other processed meat products having high oil or fat contents, when the meat protein is denatured during cooking in water after the meat is packed in casing, the emulsion is destroyed thus inducing the separation of oil or fat content, which will form fat aggregates upon cooling and thus impair the appearance of the final product to a substantial extent. Therefore, in the case of gelling by thermal denaturation of proteins, the amount in which the oil or fat content can be added is inevitably limited and this has led to the difficulty in fully utilizing their ability to provide a supple and smooth texture for meat products.

In order to eliminate this defect, the emulsion as well as the gelled emulsion must be rendered heat resistant. In other words, an emulsion composed of protein and fat (or oil) contents must be gelled in such a way that the emulsion is maintained in a heat-stable state. A method that could be used to prepare such a heat-stable gel is by crosslinking proteins. Conventionally proteins are crosslinked with common chemicals such as glutaraldehyde but such chemicals often cause problems from the viewpoint of food hygiene. A method that does not use a chemical crosslinking agent but which effects gelation by crosslinking the glutamine and lysine residues in protein through the action of transglutaminase has been reported (Japanese Patent Public Disclosure No. 58-149645). However, this method involves an enzymatic reaction and compared to chemical reactions, reaction conditions such as pH and temperature are limited. Further, the enzyme used is dependent on $Ca^{++}$ and requires the addition of a special $Ca^{++}$ source aside from protein and fat or oil components. Thus, the reaction involved in this method is difficult to control as compared to chemical reactions. In addition to these inconveniences, the enzyme must be completely inactivated after the reaction.

It has been reported that the iridoid compounds derived from Gardenia jasminoides Ellis which are used as crosslinking agents in the processes of the present invention react with primary amino group containing compounds and are further polymerized under oxidizing conditions to form blue dyes (Japanese Patent Publication No. 57-14781 and Japanese Patent Public Disclosure No. 61-47167). The safety of the blue dyes thus formed has been widely recognized as a result of their extensive use as natural pigments in foods. It has also been reported that the properties of such iridoid compounds can be used to immobilize enzyme proteins on supports (Japanese Patent Public Disclosure No. 63-157981).

SUMMARY OF THE INVENTION

An object, therefore, of the present invention is to provide a process in which the protein in an emulsion composed of protein and fat (or oil) contents is crosslinked with an iridoid compound to form a gel that is resistant to heat and which will not easily cause separation of the fat or oil content.

Another object of the present invention is to provide a method for stabilizing an emulsion composed of protein and fat (or oil) contents by crosslinking the protein content with an iridoid compound.

A further object of the present invention is to provide a gel or stabilized emulsion in which the protein in an emulsion composed of protein and fat (or oil) contents is crosslinked with an iridoid compound.

DETAILED DESCRIPTION OF THE INVENTION

In order to attain the objects described above, the present inventors conducted intensive studies on chemical crosslinking reactions which were subject to fewer limitations on reaction conditions than the enzymic reaction, and found that when an emulsion composed of protein and oil (or fat) was reacted with an iridoid compound, a gel or a stabilized emulsion could be prepared which, unlike those produced by thermal protein denaturation, was stable and heat-resistant on account of the crosslinks created by treatment with iridoid compounds. The present invention has been accomplished on the basis of this finding. The present inventors also found that the crosslinking reaction initiated by iridoid compounds could be combined with heating or other known methods of gelling the protein content of emulsions.

Hence, the present invention which is principally directed to the gelation of an emulsion composed of protein and fat (or oil) or enhancement of gel strength or stabilization of the emulsion provides a process for producing a gel or a stabilized gel by using iridoid compounds as crosslinking agents for the formation of crosslinks between the protein molecules in the emulsion.

According to this method of the present invention, a gel can be produced by crosslinking the protein in an emulsion composed of protein and fat (or oil) components in the presence of an iridoid compound added in a specified amount.

According to another aspect of the present invention, the crosslinking reaction with an iridoid compound may be combined with heating or some other known method of gelling proteins in emulsions. Stated more specifically the crosslinking reaction with an iridoid compound may be preceded, followed or simultaneously accompanied by heating or some other methods known in the art for gelling proteins in emulsions. For instance, the gel formed by heating may be immersed in a solution containing an iridoid compound so that the protein in the gel is crosslinked to enhance the gel strength.

According to a further aspect of the present invention, an emulsion composed of protein and fat (or oil) may be treated with an iridoid compound so that the protein in the emulsion is crosslinked with this compound to stabilize said emulsion.

Any iridoid compounds having a crosslinking ability may be used in the processes of the present invention and illustrative examples are the aglycones of geniposide. gardenoside, geniposidic acid, etc. Of these compounds. genipin derived from Gardenia jasminoides Ellis which is the aglycone of geniposide is most preferred. These iridoid compounds may be prepared in accordance with the disclosures in Japanese Patent Publication No. 57-14781. Japanese Patent Public Disclosure No. 61-47167. etc.

Any emulsion can be used in the present invention without particular limitation as long as it consists of protein and fat (or oil) components. They may be gelled to any desired shapes including sheets, fibers and granules. Pouring into molds having desired shapes such as sheets or blocks may be followed by gelling reaction. A gel in sheet form may be produced in the following manner: 1) a sheet of gel obtained by methods such as heating other than gelation with an iridoid compound is immersed in a solution containing an iridoid compound; or 2) an iridoid compound is added to protein containing emulsion and the mixture is poured into a mold to make a sheet of a desired thickness, followed by reaction and optional heating in a suitable apparatus such as a thermostatic chamber.

The origins of proteins that can be crosslinked by the methods of the present invention are in no way limited and any kinds of proteins may be used including vegetable and animal proteins. Exemplary vegetable proteins include defatted products of oil seeds (e.g. defatted soybean) and proteins separated therefrom, illustrative animal proteins include milk protein, egg protein, collagen, etc.

The origins of fats and oils that are used in the methods of the present invention are in no way limited and any kinds of fats and oils may be used including vegetable oils and animal fats. Illustrative vegetable oils include soybean oil, safflower oil, palm oil, etc. and illustrative animal fats include lard and tallow. These fats and oils may be further processed and they are also included within the scope of "fats and oils" that can be used in the present invention. Compounds associated with fats and oils are also usable. Oil-soluble components such as vitamin E may be incorporated in the oils and fats mentioned above.

In gelling emulsions, iridoid compounds are used in amounts generally ranging from 0.001 to 1 part, preferably from 0.005 to 0.5 part, per part by weight of dry protein. It is preferred that the concentration of protein in the emulsion is comparatively high, usually at least 2 wt %. with the range of 5-20 wt % being particularly preferred. If the protein concentration is less than 2 wt %. gel will not form even in the presence of iridoid compounds although the latter will contribute to the stabilization of emulsions. The content of fat or oil component in the emulsion is generally at least 2 wt %.. preferably from 5 to 40 wt %. The following conditions may be used for the gelling reaction: pH, 4–10; reaction temperature. 5–100° C. preferably 5°–70° C; and reaction time, 10 minutes to 70 hours, with optional stirring, the range of which may vary depending upon pH and temperature.

The proportions of protein, fat (or oil) and water in the gel or stabilized emulsion that are produced by the processes of the present invention can be freely adjusted to match the specific use of these products. Further, they are safe to eat and can be used as food ingredients in various food products including sausages and hams.

Gelation by the crosslinking reaction which is employed in the processes of the present invention can be performed at lower temperatures than gelation by thermal protein denaturation so that it has the advantage of preventing separation of fat or oil components from the emulsion. Further, the gel obtained by crosslinking proteins is heat-stable and will not experience separation of oil or fat components upon heating, thereby allowing fat or oil components to be incorporated in greater amounts than in the case where conventional methods of emulsification and gelling are employed. Consequently, the proportions of proteins, oils or fats, and water can be freely selected, offering the advantage that the gel or stabilized emulsion obtained can be easily processed into food additives that meet specific requirements for such aspects as palatability, flavor, nutritive value, etc.

The following examples are provided for the purpose of further illustrating the present invention but are in no way to be taken as limiting.

EXAMPLE 1

Soybean oil and soy protein isolates (Fujipro SE of Fuji Oil Co., Ltd.) were charge into a cutter and stirred gently. With continued stirring, water was slowly added to complete the emulsification. Subsequently genipin was added to the resulting emulsion and the mixture was heated at 40° C. for 1 hour to crosslink the protein so that a gel formed. The proportions of the respective components were as follows: 0.01 part of genipin and 15 or 20 parts of fat per part by weight of protein.

COMPARATIVE EXAMPLE 1

The respective components were mixed and emulsified in the same proportions as in Example 1. except that no genipin was added.

The emulsions prepared in Example 1 and Comparative Example 1 were subjected to a heat resistance test by the following method: each emulsion was transferred into a beaker, which was heated in a water bath at 80° C. for 1 hour, and an observation was made to determine whether or not the fat component would separate. The results are shown in Table 1.

TABLE 1

| Protein:genipin:fat:water | State after heating |
|---|---|
| 1:0.01:15:15 | gel, no fat separation |
| 1:0:15:15 | sol, fat separated |
| 1:0.01:20:20 | gel, no fat separation |
| 1:0:20:20 | sol, fat separated |

As the above data shows, crosslinking proteins with genipin was effective in stabilizing the emulsion to form a resilient gel incorporating large amounts of fat and water.

EXAMPLE 2

To a mixture of sodium chloride (2 g), sodium tripolyphosphate (0.48 g), sodium glutamate (0.4 g), genipin (0.08 g), flavor (0.3 g) and sugar (0.8 g), water was added to make a weight of 40 g. To the mixture, soy protein isolates (8 g) and lard (40 g) were added and emulsified with a homo-mixer to prepare an emulsified salt solution. Comminuted meat (100 g) was immersed in this emulsified salt solution and starch (4.6 g) was added, followed by mixing and packing in a casing. The encased meat was heated at 40° C. for 30 minutes to effect a crosslinking reaction and was thereafter cooked in water at 75° C. for 40 minutes. The so prepared sausage contained about 20 wt % of lard but there was no detectable migration of lard to the inside surface of the casing even when it was cooled. In addition, the sausage had good palatability.

EXAMPLE 3

A sausage was prepared as in Example 2 except that 8 g of soy protein isolates was replaced by 4 g of sodium caseinate. In Example 3. there was also no detectable migration of lard to the inside surface of the casing even when the sausage was cooled.

COMPARATIVE EXAMPLE 2

Sausages were prepared as in Examples 2 and 3 except that no genipin was added. Separation of the fat component was observed during cooking in water. In addition, migration of fat to the inside surface of the casing was observed after cooling.

EXAMPLE 4

To 10 parts by weight of soy protein isolates, soybean oil (1 part), glycerin (2 parts), genipin (0.1 part) and water (100 parts) were added and homogenized by stirring with a mixer. The resulting emulsion was poured into a mold to a thickness of 500 μm and left to stand in a thermostatic chamber at 100° C. for 10 minutes until a film formed. The soybean protein sheet thus obtained had a thickness of 80 μm and was highly plastic.

What is claimed is:

1. A process for producing a gel comprising: mixing a protein and a fat or oil component to provide an emulsion and, adding a crosslinking agent before or after said mixing resulting in the crosslinking of said protein to provide said gel, wherein the crosslinking agent is selected from the group consisting of iridoid compounds and the weight proportion of said fat or oil component to said protein in said gel is 5-20:1.

2. A process according to claim 1 wherein the iridoid compound is genipin.

3. A process for producing a gel by combining two methods of gelation, one being by crosslinking the protein in an emulsion composed of a protein and 5-20 parts by weight on the basis of said protein of a fat or oil component with an iridoid compound, and the other being another method of protein gelation.

4. A process according to claim 3 wherein the iridoid compound is genipin.

5. A process according to claim 3 wherein said another method of protein gelatin is heating.

6. A process according to claim 3, 4 or 5 wherein the protein in an emulsion composed of a protein and a fat or oil component is gelled by heating and then immersed in a solution of an iridoid compound.

7. A process according to any one of claims 1-5 wherein the emulsion is molded into a gel in sheet form.

8. A process for producing an emulsion gel by crosslinking the protein in an emulsion composed of a protein and 5-20 parts by weight on the basis of said protein of a fat or oil component with an iridoid compound.

9. A gel in which a protein in an emulsion, composed of a protein and 5-20 parts by weight on the basis of said protein of a fat or oil compound, has been crosslinked with an iridoid compound.

10. A gel according to claim 9 wherein the compound is genipin.

11. An emulsified gel product in which the protein in an emulsion composed of a protein and 5-20 parts by weight on the basis of protein of a fat or oil component is crosslinked with an iridoid compound.

* * * * *